US007577563B2

(12) United States Patent
El-Maleh et al.

(10) Patent No.: US 7,577,563 B2
(45) Date of Patent: Aug. 18, 2009

(54) ENHANCED CONVERSION OF WIDEBAND SIGNALS TO NARROWBAND SIGNALS

(75) Inventors: Khaled H. El-Maleh, San Diego, CA (US); Arasanipalai K. Ananthapadmanabhan, San Diego, CA (US); Andrew P. DeJaco, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 167 days.

(21) Appl. No.: 11/534,327

(22) Filed: Sep. 22, 2006

(65) Prior Publication Data

US 2007/0162279 A1 Jul. 12, 2007

Related U.S. Application Data

(63) Continuation of application No. 09/771,508, filed on Jan. 24, 2001, now Pat. No. 7,113,522.

(51) Int. Cl.
*H04W 7/216* (2006.01)
*G10L 19/00* (2006.01)
*G10L 19/14* (2006.01)

(52) U.S. Cl. ........................ 704/201; 704/205; 370/328

(58) Field of Classification Search ................. 704/228, 704/220, 275, 269, 200, 203; 370/480, 481, 370/497, 484
See application file for complete search history.

(56) References Cited

U.S. PATENT DOCUMENTS 4,901,307 A 2/1990 Gilhousen et al.
5,103,459 A 4/1992 Gilhousen et al.
5,414,796 A 5/1995 Jacobs et al.
5,581,652 A * 12/1996 Abe et al. .................... 704/222
5,585,850 A * 12/1996 Schwaller .............. 375/240.01
5,640,385 A 6/1997 Long et al.

(Continued)

FOREIGN PATENT DOCUMENTS

EP 0 657 873 B1 6/2000

(Continued)

OTHER PUBLICATIONS

Yasukawa, H., "Spectrum Broadening of Telephone Band Signals Using Multirate Processing for Speech Quality Enhancement," The Institute of Electronics, Information and Communication Engineers ("IEICE"), Transactions on Fundamentals of Electronics, Communications and Computer Sciences, Tokyo, Japan, vol. E78-A, No. 8, Aug. 1995, pp. 996-998.

(Continued)

*Primary Examiner*—Hanh Nguyen

(57) ABSTRACT

Wideband speech signals must be converted to narrowband speech signals if the transmission medium or the destination terminal is constructed with narrowband constraints. A typical wideband-to-narrowband conversion method is the elimination of frequencies above 3400 Hz using a low pass filter and a down sampler. However, this method produces a muffled speech sound since the resulting narrowband signal has a flat frequency response. Methods and apparatus are presented herein to enhance the acoustic quality of a wideband-to-narrowband converted signal. A bandwidth switching filter is used to emphasize a mid-range frequency portion of the wideband signal so that the resulting narrowband signal has a non-flat frequency spectrum.

16 Claims, 6 Drawing Sheets

U.S. PATENT DOCUMENTS

| | | | | |
|---|---|---|---|---|
| 5,844,899 | A | 12/1998 | Daley et al. | |
| 5,903,862 | A | 5/1999 | Weaver, Jr. et al. | |
| 5,915,235 | A | 6/1999 | DeJaco et al. | |
| 5,956,673 | A | 9/1999 | Weaver, Jr. et al. | |
| 6,362,762 | B1 | 3/2002 | Jensen et al. | |
| 6,539,050 | B1 | 3/2003 | Lee et al. | |
| 6,681,202 | B1 * | 1/2004 | Miet et al. | 704/214 |
| 6,704,711 | B2 | 3/2004 | Gustafsson et al. | |
| 7,113,522 | B2 * | 9/2006 | El-Maleh et al. | 370/481 |

FOREIGN PATENT DOCUMENTS

| | | |
|---|---|---|
| JP | 58-198097 | 11/1983 |
| JP | 62-135022 | 6/1987 |
| JP | 03-151745 | 6/1991 |
| JP | 06-078062 | 3/1994 |
| JP | 07-146700 | 6/1995 |
| JP | 08-163056 | 6/1996 |
| JP | 2000-276200 | 10/2000 |

OTHER PUBLICATIONS

International Telecommunication Union, Telecommunication Standards Sector ("ITU-T"), "General Aspects of Digital Transmission Systems; Terminal Equipments; 7 kHz Audio-Coding Within 64 Kbit/s," ITU Recommendation G.722, Melbourne 1988, pp. 1-73 (Blue Book pagination is 269-341).

WO 02/060075 A3, International Search Report of related PCT application.

ETSI TS 125 211 V3.1.1 Universal Mobile Telecommunications System (UMTS); Physical Channels and Mapping of Transport Channels Onto Physical Channels (FDD) (3G TS 25.211 Version 3.1.1 Release 1999) (Jan. 2000).

ETSI TS 125 212 V3.3.0 Universal Mobile Telecommunications System (UMTS); Multiplexing and Channel Coding (FDD) (3G TS 25.212 Version 3.3.0 Release 1999) (Jun. 2000).

ETSI TS 125 213 V3.3.0 Universal Mobile Telecommunications Systems (UMTS), Spreading and Modulation (FDD) (3G TS 25.213 Version 3.3.0 Release 1999) (Jun. 2000).

ETSI TS 125 214 V3.3.0 Universal Mobile Telecommunications System (UMTS); Physical Layer Procedures (FDD) (3G TS 25.214 Version 3.3.0 Release 1999) (Jun. 2000).

Adoule, J.P., et al., "Wideband Speech Coding," in "Speech Coding and Synthesis," ch. 8, eds. Kleijn et al., Elsevier Science, B.V., The Netherlands, 1995, pp. 289-308.

* cited by examiner (Not to scale)

(Not to scale)

(Not to scale)

(Not to scale)

(Not to scale)

(Not to scale)

ENHANCED CONVERSION OF WIDEBAND SIGNALS TO NARROWBAND SIGNALS

This application is a continuation of application Ser. No. 09/771,508 filed Jan. 24, 2001.

BACKGROUND

I. Field

The present invention relates to communication systems, and more particularly, to the enhanced conversion of wideband speech signals to narrowband speech signals.

II. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. (As used herein, the term "cellular" systems encompasses both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008 (often referred to collectively herein as IS-95), and proposed high-data-rate systems for data, etc. are promulgated by the Telecommunication Industry Association (TIA), the International Telecommunications Union (ITU), and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and fully incorporated herein by reference. An exemplary described system utilizing CDMA techniques is the cdma2000 ITU-R Radio Transmission Technology (RTT) Candidate Submission (referred to herein as cdma2000), issued by the TIA. The standard for cdma2000 is given in draft versions of IS-2000 and has been approved by the TIA. The cdma2000 proposal is compatible with IS-95 systems in many ways. Another CDMA standard is the W-CDMA standard, as embodied in 3$^{rd}$ *Generation Partnership Project "3GPP"*, Document Nos. 3G TS 25.211, 3G TS 25.212, 3G TS 25.213, and 3G TS 25.214.

In a traditional landline telephone system, the transmission medium and terminals are bandlimited to 4000 Hz. Speech is typically transmitted in a narrow range of 300 Hz to 3400 Hz, with control and signaling overhead carried outside this range. In view of the physical constraints of landline telephone systems, signal propagation within cellular telephone systems is implemented with these same narrow frequency constraints so that calls originating from a cellular subscriber unit can be transmitted to a landline unit. However, cellular telephone systems are capable of transmitting signals with wider frequency ranges, since the physical limitations requiring a narrow frequency range are not present within the cellular system. An exemplary standard for generating signals with a wider frequency range is promulgated in document G.722 ITU-T, entitled "7 kHz Audio-Coding within 64 kBits/s," published in 1989.

In the transmission of speech signals, the perceptual quality of the acoustic waveform is of primary importance to users and service providers. If a wireless communication system transmits signals with a wideband frequency range of 50 Hz to 7000 Hz, a conversion problem arises when a wideband signal terminates within a narrowband environment that attenuates the high frequency components of the wideband signal. Hence, there is a present need in the art to be able to convert a wideband speech signal into a narrowband speech signal without the loss of acoustic quality.

SUMMARY

Novel methods and apparatus for converting wideband speech signals to narrowband speech signals are presented. In one aspect, an apparatus for converting a wideband signal into a narrowband signal is presented, the apparatus comprising: a filter for emphasizing a mid-range portion of the frequency response of the wideband signal and for attenuating a high range portion of the frequency response of the wideband signal, wherein the output of the filter is a narrowband signal with a non-flat frequency response; and a down sampler for decimating the sampling rate of the wideband signal.

In another aspect, an apparatus for converting a wideband speech signal into a narrowband speech signal comprises: a control element for determining whether to convert the wideband speech signal into the narrowband speech signal; a switch coupled to the control element, wherein the control element activates the switch if the control element determines that the wideband speech signal will be converted; a bandwidth switching filter for receiving the wideband speech signal if the switch is activated, wherein the bandwidth switching filter emphasizes a portion of the frequency spectrum of the wideband speech signal to produce an output signal with a non-flat frequency spectrum; and a down sampler for decimating the output signal of the bandwidth switching filter.

In another aspect, an apparatus for decoding a wideband speech signal and for converting the wideband speech signal into a narrowband speech signal is presented, the apparatus comprising: a speech synthesis element for creating a synthesized wideband speech signal; and a post-processing element for enhancing the synthesized wideband speech signal, wherein the post-processing element further comprises: a post-filter element; and a bandwidth switching filter for emphasizing a middle range of the frequency spectrum of the synthesized wideband speech signal and attenuating a high range of the frequency spectrum of the synthesized wideband speech signal.

In another aspect, a method for transmitting wideband waveforms originating in a wireless communication system is presented, the method comprising: receiving a signal carrying a wideband waveform at a base station, wherein the wideband waveform is for further transmission from the base station to a target destination; determining whether the target destination can process the wideband waveform; if the target destination cannot process the wideband waveform, then converting the wideband waveform into a narrowband waveform with a non-flat frequency response; and if the target destination can process the wideband waveform, then transmitting the wideband waveform from the base station to the target destination without converting the wideband waveform into a narrowband waveform.

In another aspect, a determination of whether the target destination is supported by a wideband vocoder comprises:

embedding a detection code within a pulse code modulation (PCM) signal, wherein the PCM signal carries the wideband waveform; and if the target destination detects the detection code, then transmitting an acknowledgement of the detection code from the target destination via a second base station, wherein the second base station supports communication with the target destination and the wireless communication system.

DETAILED DESCRIPTION OF THE DRAWINGS

DETAILED DESCRIPTION OF THE EMBODIMENTS

Figure 1:
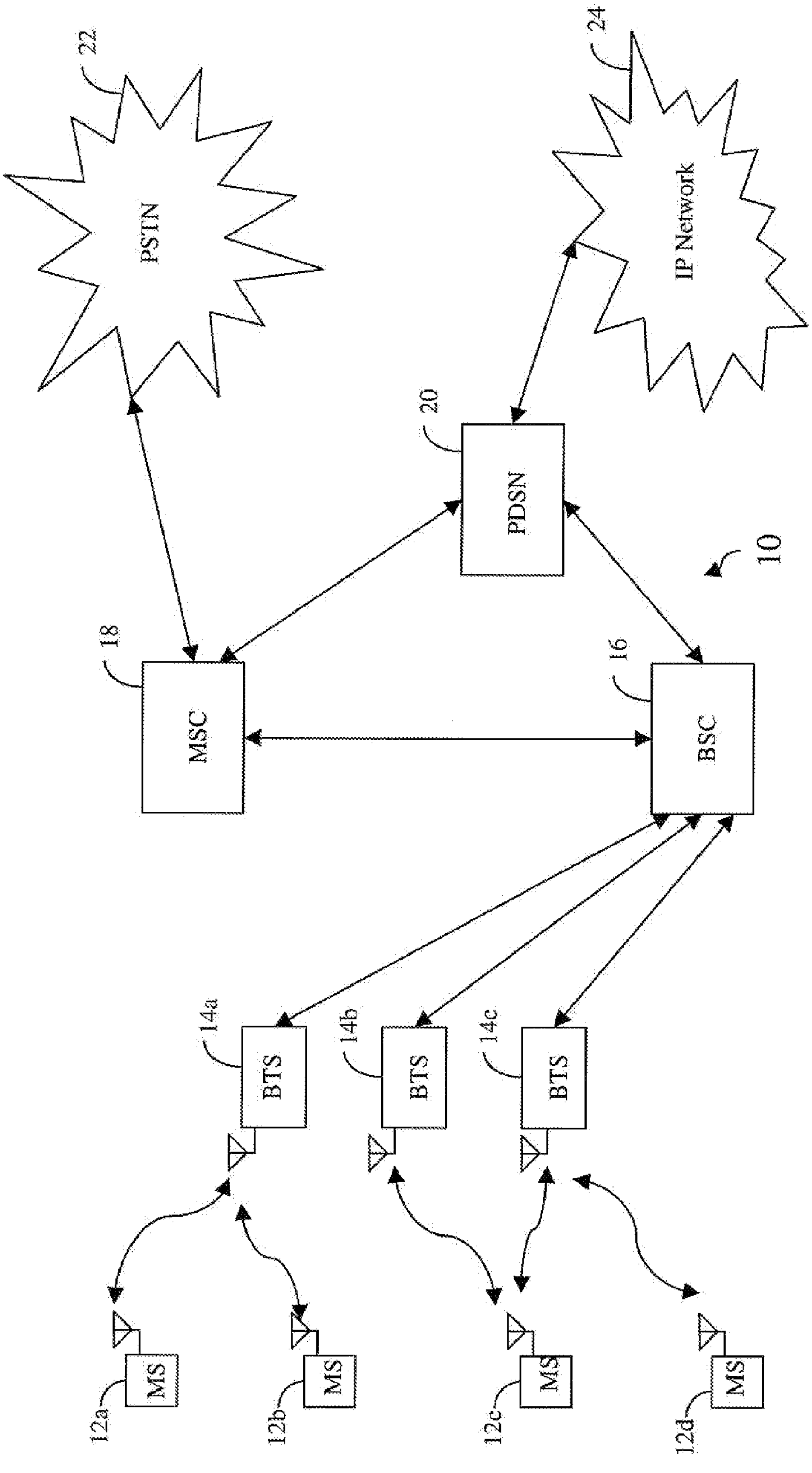
FIG. 1 is a diagram of an exemplary communication system.

As illustrated in FIG. 1, a wireless communication network 10 generally includes a plurality of mobile stations (also called subscriber units or user equipment) 12*a*-12*d*, a plurality of base stations (also called base station transceivers (BTSs) or Node B) 14*a*-14*c*, a base station controller (BSC) (also called radio network controller or packet control function 16), a mobile switching center (MSC) or switch 24, a packet data serving node (PDSN) or internetworking function (IWF) 20, a public switched telephone network (PSTN) 22 (typically a telephone company), and an Internet Protocol (IP) network 18 (typically the Internet). For purposes of simplicity, four mobile stations 12*a*-12*d*, three base stations 14*a*-14*c*, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12*a*-12*d* may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12*a*-12*d* may be configured to perform one or more wireless packet data protocols such as described in, for example, the EIA/TIA/IS-707 standard. In a particular embodiment, the mobile stations 12*a*-12*d* generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC 18 is coupled to the BSC 16 and the PSTN 22, and the BSC 16 is coupled to the base stations 14*a*-14*c* via wirelines configured for transmission of voice and/or data packets in accordance with any of several known protocols including, e.g., E1, T1, Asynchronous Transfer Mode (ATM), IP, Frame Relay, HDSL, ADSL, or xDSL. In an alternate embodiment, the BSC 16 is coupled directly to the PDSN 20, and the MSC 18 is not coupled to the PDSN 20. In another embodiment of the invention, the mobile stations 12*a*-12*d* communicate with the base stations 14*a*-14*c* over an RF interface defined in the $3^{rd}$ *Generation Partnership Project* 2 "3*GPP*2", "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14*a*-14*c* receive and demodulate sets of reverse-link signals from various mobile stations 12*a*-12*d* engaged in telephone calls, Web browsing, or other data communications. Each reverse-link signal received by a given base station 14*a*-14*c* is processed within that base station 14*a*-14*c*. Each base station 14*a*-14*c* may communicate with a plurality of mobile stations 12*a*-12*d* by modulating and transmitting sets of forward-link signals to the mobile stations 12*a*-12*d*. For example, as shown in FIG. 1, the base station 14*a* communicates with first and second mobile stations 12*a*, 12*b* simultaneously, and the base station 14*c* communicates with third and fourth mobile stations 12*c*, 12*d* simultaneously. The resulting packets are forwarded to the BSC 16, which provides call resource allocation and mobility management functionality including the orchestration of soft handoffs of a call for a particular mobile station 12*a*-12*d* from one base station 14*a*-14*c* to another base station 14*a*-14*c*. For example, a mobile station 12*c* is communicating with two base stations 14*b*, 14*c* simultaneously. Eventually, when the mobile station 12*c* moves far enough away from one of the base stations 14*c*, the call will be handed off to the other base station 14*b*.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24. Typically, conversion of an analog voice signal to a digital signal is performed by an encoder and conversion of the digital signal back to a voice signal is performed by a decoder. In an exemplary CDMA system, a vocoder comprising both an encoding portion and a decoding portion is collated within mobile units and base stations. An exemplary vocoder is described in U.S. Pat. No. 5,414,796, entitled "Variable Rate Vocoder," assigned to the assignee of the present invention and incorporated by reference herein. In a vocoder, an encoding portion extracts parameters that relate to a model of human speech generation. A decoding portion re-synthesizes the speech using the parameters received over a transmission channel. The model is constantly changing to accurately model the time varying speech signal. Thus, the speech is divided into blocks of time, or analysis frames, during which the parameters are calculated. The parameters are then updated for each new frame. As used herein, the word "decoder" refers to any device or any portion of a device that can be used to convert digital signals that have been received over a transmission medium. Hence, the embodiments described herein can be implemented with vocoders of CDMA systems and decoders of non-CDMA systems.

Acoustic speech is usually composed of low and high frequency components. However, due to the physical limitations of a conventional telephone system, input speech is band limited to a narrow range of 200 Hz to 3400 Hz. A filter is a device that modifies the frequency spectrum of an input waveform to produce an output waveform. Such modifications can be characterized by the transfer function $H(f)=Y(f)/X(f)$, which relates the modified output waveform $y(t)$ to the original input waveform $x(t)$ in the frequency domain.

Figure 2A:
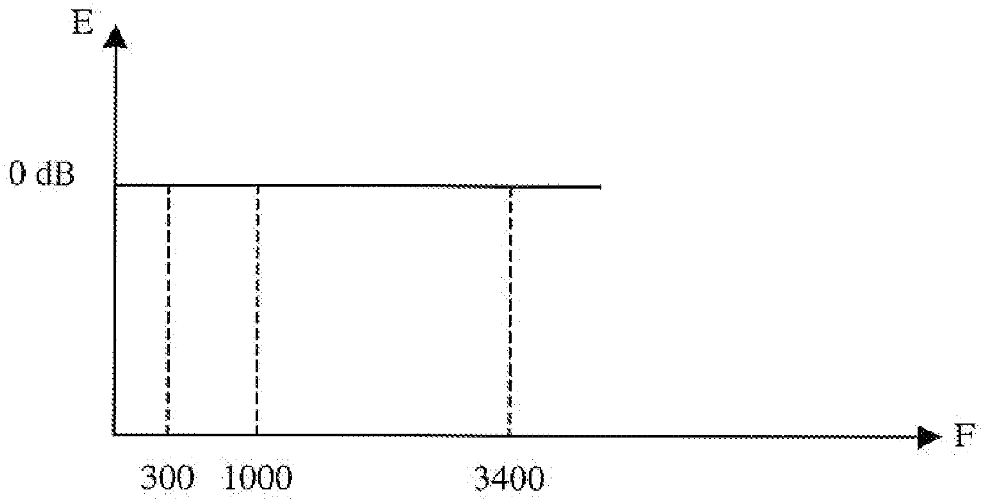
FIG. 2A is a graph of a flat narrowband frequency response.

FIG. 2A illustrates the spectrum of a narrowband filter with a flat frequency response. An example of a device with this characteristic is a microphone. As shown, the lower frequencies are overemphasized and the higher frequencies are cut off. An input signal that passes through this filter would result in an output waveform that is perceptually unpleasant to the human ear, i.e., the filtered speech is muffled.

Figure 2B:
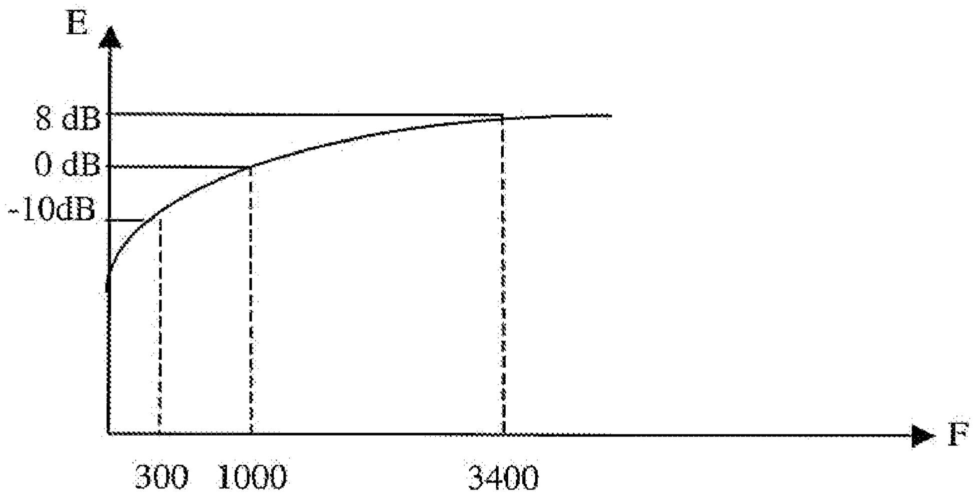
FIG. 2B is a graph of a spectrum of a narrowband filter that emphasizes the frequencies between 1000 Hz and 3400 Hz.

FIG. 2B illustrates the spectrum of a narrowband filter that emphasizes the frequencies between 1000 Hz and 3400 Hz. In this example, the lower frequencies are attenuated, but the frequency spectrum between 1000 Hz and 3400 Hz is emphasized. The emphasis in this frequency range perceptually compensates for the omission of frequency components above 3400 Hz. Hence, a more "natural" and intelligible sound is perceived by the end user when hearing the filtered signal.

Figure 3A:
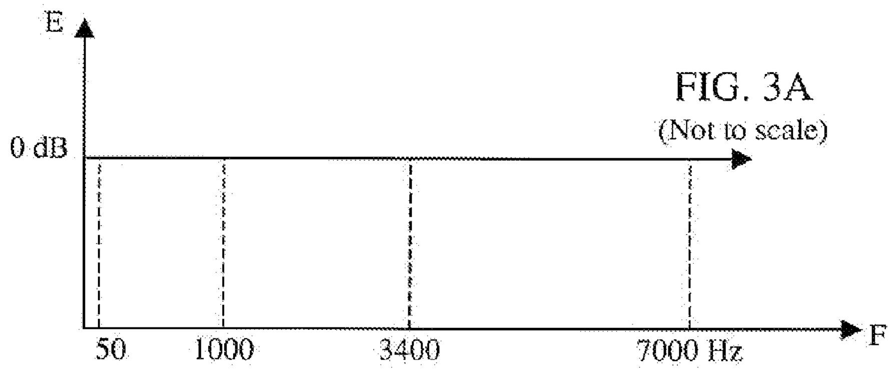
FIG. 3A is a graph of a flat wideband frequency response.

Due to improvements in wireless telephony, many wireless communication systems are capable of propagating acoustic signals in the wider range of 50 Hz to 7000 Hz. Such signals are referred to as wideband signals. Communications using this frequency range have been standardized in document G.722 ITU-T, entitled "7 kHz Audio-Coding within 64 kBits/s," published in 1989. Since frequency components up to 7000 Hz can be carried by a wideband system, a typical wideband decoder can be implemented with a flat frequency response. FIG. 3A is a graph of the flat frequency spectrum of a wideband signal. No emphasis is required since the frequency components between 3400 Hz and 7000 Hz are included. Inclusion of these higher frequency components produces a perceptually intelligible waveform without the need to emphasize the frequency range between 1000 Hz and 3400 Hz.

However, a problem arises when a wideband signal is transmitted to a narrowband terminal or through a narrowband system. In the current state of the art, the wideband signal is band limited to the constraints of the narrowband terminal/system by a simple frequency cut off at 3400 Hz. This wideband-to-narrowband conversion can be accomplished by passing the wideband signal through a low pass filter and down-sampling the result. Hence, the spectrum of a converted wideband signal closely resembles the spectrum of FIG. 2A. As discussed above, this flat frequency response produces an unacceptable waveform for human perception. Hence, there is a present need for an enhanced conversion of wideband signals to narrowband signals, so that the converted narrowband signals are perceptually pleasing to the end user. The embodiments described herein accomplish the conversion of wideband signals to narrowband signals while retaining pleasing audio components.

Figure 4:
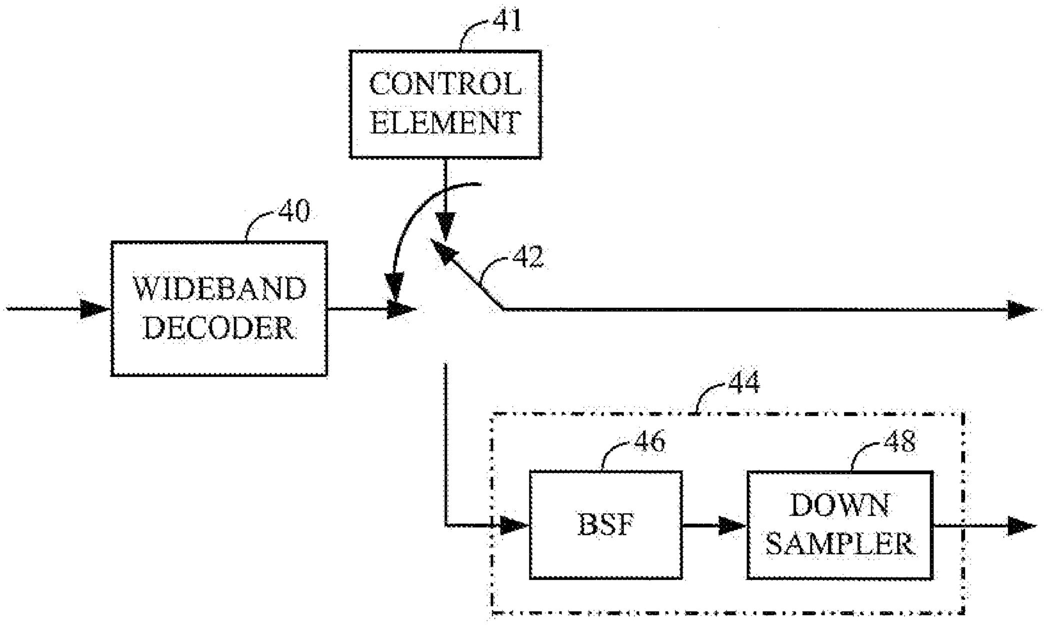
FIG. 4 is a block diagram of a wideband-to-narrowband conversion apparatus coupled to a decoder.

FIG. 4 is a block diagram of an embodiment that can be coupled to an already existing wideband decoder. The embodiment is a wideband-to-narrowband conversion apparatus configured to reduce the loss of signal information when a wideband signal is transformed into a narrowband signal. The preservation of signal information produces a perceptually pleasing audio signal for the end user.

A base station (not shown) receives a stream of information bits for input into a wideband decoder 40. Wideband decoder 40 may be configured to output a waveform in accordance with G.722 ITU-T or any other waveform that is not band limited to 3400 Hz. Variances in the bandwidth of the waveform will not affect the scope of this embodiment. A control element (not shown) in the base station makes a determination as to whether the output of the wideband decoder 40 will be transmitted to a narrowband terminal. Methods and apparatus for determining whether to convert the wideband signal to a narrowband signal are described below. If the output of the wideband decoder 40 is to be sent to a narrowband terminal or a narrowband system, then the control element (not shown) activates a switch 42 to send the wideband decoder output to a wideband-to-narrowband conversion apparatus 44. The wideband-to-narrowband conversion apparatus 44 comprises a bandwidth switching filter (BSF) 46 whose output is coupled to a down-sampler 48.

Figure 3B:
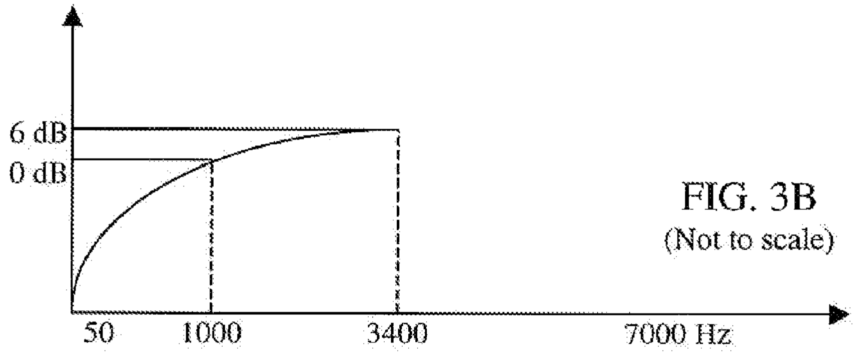
FIG. 3B is a graph of a favorable frequency response.
Figure 3C:
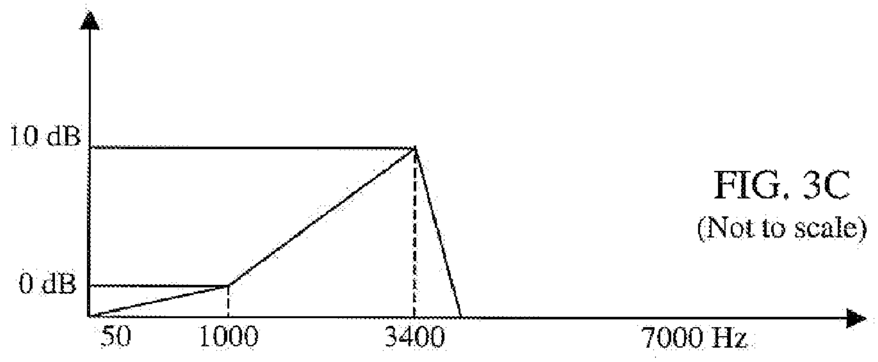
FIG. 3C is a graph of another favorable frequency response.
Figure 3D:
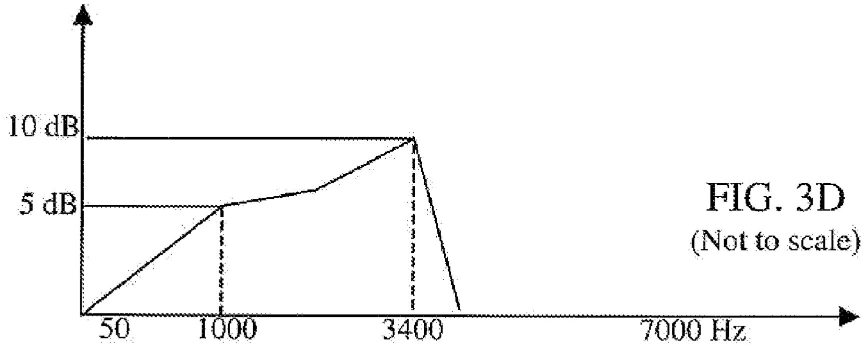
FIG. 3D is a graph of another favorable frequency response.

The bandwidth switching filter 46 can be implemented with any filter that has a frequency response characterized by a curve with a slope of 5 dB to 10 dB in the middle range of frequencies. An optimum mid-range is between the frequencies 1000 Hz and 3400 Hz, but larger or smaller ranges, such as 800-3500 Hz or 1100-3300 Hz, can be used without affecting the scope of this embodiment. Frequencies above the mid-range are attenuated in order to approximate a narrowband response. FIG. 3B is a representative example of a frequency response with the desired slope. However, filters with differently shaped curves can also be used. For example, FIG. 3C illustrates a frequency spectrum with a straight slope that can also be used in this embodiment. FIG. 3D illustrates another useful frequency response wherein the spectrum comprises linear piecewise segments with varying slopes. The bandwidth switching filter 46 can be implemented as a fixed filter, with constant filter coefficients, or as an adaptive filter, with updated filter coefficients. This design choice should be made in accordance with predetermined system parameters and does not affect the scope of this embodiment.

The down-sampler 48 can be implemented by any device that can determine a new sequence of samples $y(n)$ from an input sequence $x(n)$ so that $y(n)=x(Mn)$, wherein M is a positive integer value.

In one embodiment, the decimation of samples occurs at a rate of M=2, since a wideband signal is typically sampled at 16 kHz and a narrowband signal is typically sampled at 8 kHz. Since the decimation occurs after the filtering performed by the bandwidth switching filter 46, an interpolator can be used at the narrowband target terminal to recover the decimated portions of the switched signal.

Figure 5:
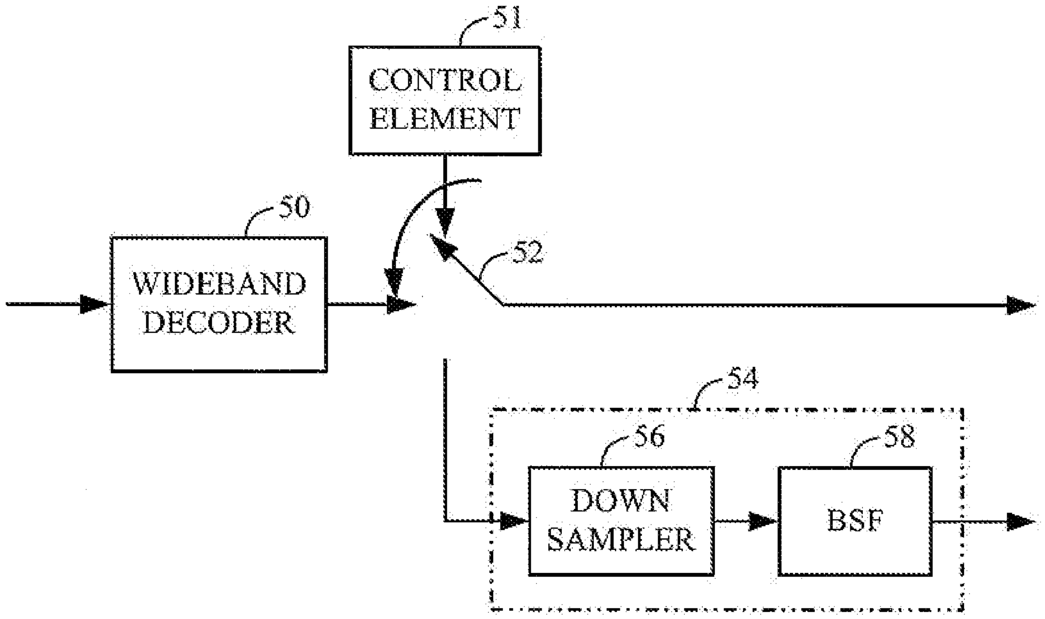
FIG. 5 is a block diagram of another wideband-to-narrowband conversion apparatus coupled to a decoder.

FIG. 5 is a block diagram of another wideband-to-narrowband switching apparatus coupled to a wideband decoder. In this embodiment, the wideband-to-narrowband switching apparatus is configured to reduce the number of computations that are needed to convert the wideband signal to a narrowband signal.

A base station (not shown) receives a stream of information bits for input into a wideband decoder 50. Wideband decoder 50 outputs a waveform in accordance with G.722 ITU-T or any other waveform with frequency components higher than 3400 Hz without affecting the scope of this embodiment. A control element (not shown) in the base station makes a determination as to whether the output of the wideband decoder 50 will be transmitted to a narrowband terminal or through a narrowband system. If the output of the wideband decoder 50 is to be sent to a narrowband terminal or through a narrowband system, then the control element (not shown) activates a switch 52 to send the wideband decoder output to a wideband-to-narrowband conversion apparatus 54. The wideband-to-narrowband conversion apparatus 54 comprises a down-sampler 56 whose output is coupled to a bandwidth switching filter (BSF) 58.

In one embodiment, the down-sampler decimates samples at a rate M=2. In a typical wideband system, the signal is sampled at a rate of 16 kHz. If the down-sampler operates at a rate M=2, half the samples are discarded and the bandwidth switching filter 58 is operating upon an 8 kHz signal. Hence, the bandwidth switching filter 58 of FIG. 5 can be constructed to be less computationally complex than the bandwidth switching filter 46 of FIG. 4. However, like the bandwidth switching filter 46 of FIG. 4, the bandwidth switching filter 58 can be implemented with any filter that has a frequency response characterized by a curve with a slope of 5-10 dB between the mid-range frequencies.

The embodiments discussed above have been described as add-on components that can be used in conjunction with an already existing wideband decoder. However, an embodiment of a novel and nonobvious wideband decoder is envisioned wherein the frequency spectrum of the output signal exhibits a high frequency emphasis.

Figure 6:
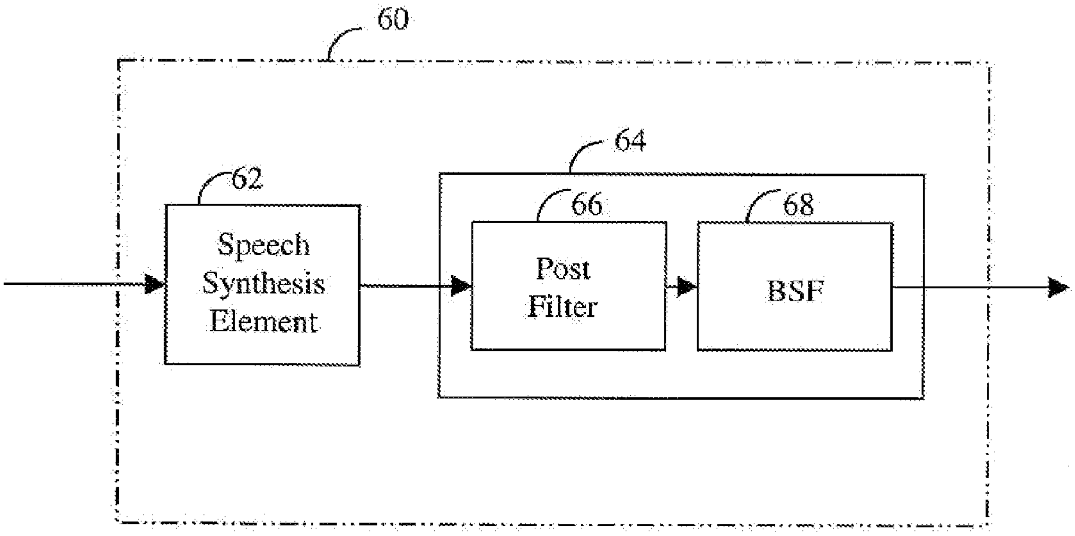
FIG. 6 is a block diagram of wideband decoder that outputs a signal with a non-flat frequency response.

FIG. 6 is a functional block diagram of a wideband decoder 60 that is configured to output a narrowband signal with a non-flat frequency spectrum. Decoder 60 comprises a speech synthesis element 62 and a post-processing element 64. The speech synthesis element 62 receives speech information carrying parameters of the speech signal and an appropriate excitation signal. Many examples of the parameterization of the speech signal use linear predictive coding (LPC) techniques, wherein coefficients of a filter model can be recreated at a decoder from autocorrelation values. Alternatively, the values of the LPC coefficients can be transmitted directly from the encoding source to the decoder. A more detailed explanation of various linear predictive coding techniques is described in aforementioned U.S. Pat. No. 5,414,796.

The speech that is synthesized from speech synthesis element 62 is usually intelligible. However, the quality of the synthesized speech can be distorted. Hence, the post-processing element 64 is required to enhance the synthesized speech to produce a more "natural" effect. Post-processing element 64 comprises at least one post filter 66 and a bandwidth switching filter 68. A conventional post filter 66 can comprise a combination of a pitch post filter, a formant post filter, and a tilt compensation filter. However, a conventional post filter 66 does not guarantee the desired frequency emphasis of the present embodiment because the entire wideband frequency spectrum of the signal is processed. The bandwidth switching filter 68 that is coupled to the post filter 66 guarantees the emphasis of a specific subgroup of frequencies. A control element (not shown) controls whether to send the output of the post filter 66 through the bandwidth switching filter 68.

Bandwidth switching filter 68 can be implemented as described in the embodiments above, wherein the curve of the spectrum magnitude has a slope of at least 5 dB to 10 dB between the frequency range of approximately 1000 Hz and 3400 Hz. The placement order of the bandwidth switching filter 68 and the post filter 66 can be altered without affecting the scope of this embodiment.

Figure 7:
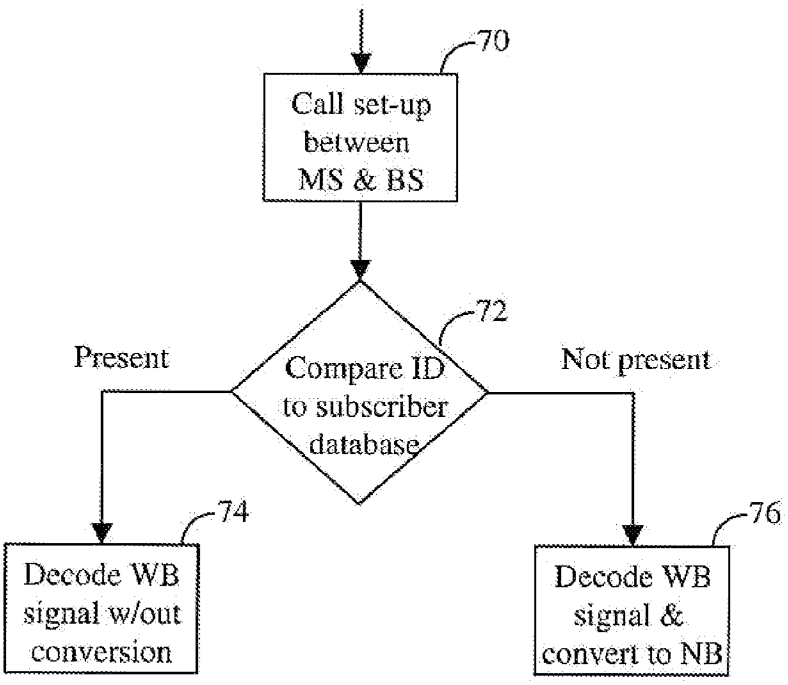
FIG. 7 is a flow chart of a method for determining whether to convert a wideband speech signal to a narrowband speech signal.

FIG. 7 is a flow chart for determining whether to implement a wideband-to-narrowband signal conversion within a wideband system. At step 70, a control element located within a base station is noticed of the arrival of a wideband signal transmission from a subscriber unit. In a typical wireless communication system, such notice of the arrival of any signal transmission is conveyed during a call set-up or registration period. During the call set-up period, information as to the final destination address of the signal transmission is sent to the control element. The final destination address typically corresponds to the telephone number entered by the user of the originating subscriber unit or to a stored address that is chosen by the user. An example of a call set-up procedure is found in U.S. Pat. No. 5,844,899, entitled, "Method and Apparatus for Providing A Call Identifier in a Distributed Network System," assigned to the assignee of the present invention and incorporated by reference herein.

At step 72, the control element compares the final destination address of the signal transmission to a database of mobile subscriber units used within the wideband system. In a CDMA system, such as the system illustrated in FIG. 1, a mobile subscriber database would be found in a mobile switching center 18. If the final destination number is found within the database, then at step 74, the control element proceeds to decode the wideband signal without conversion to a narrowband signal. If the final destination number is not found within the database, then at step 76, the control element activates the switch that routes the output of the wideband decoder to a wideband-to-narrowband conversion apparatus, the implementation of which is described above.

Alternatively, if the communication system supports both wideband and narrowband subscriber units and the signal originates from a wideband terminal, then the database of mobile subscriber units can be substituted with a database of wideband mobile subscriber units and the above-mentioned method steps can be performed.

Alternatively, the database of mobile subscriber units can be substituted with a database of all registered communication subscriber units, including mobile subscribers and landline subscribers, wherein the bandwidth capacities of the communication terminals are also stored. Hence, rather than determining the presence of the final destination number on the database, a determination is made as to whether the final destination number is supported by a wideband terminal.

In another embodiment, if the wideband communication system permits multiple communication links between communication units, i.e., teleconferencing, then a control element can be programmed or configured to convert multiple wideband signals into multiple narrowband signals. Such a conversion would allow the system to increase the number of participants in a teleconference call.

Figure 8:
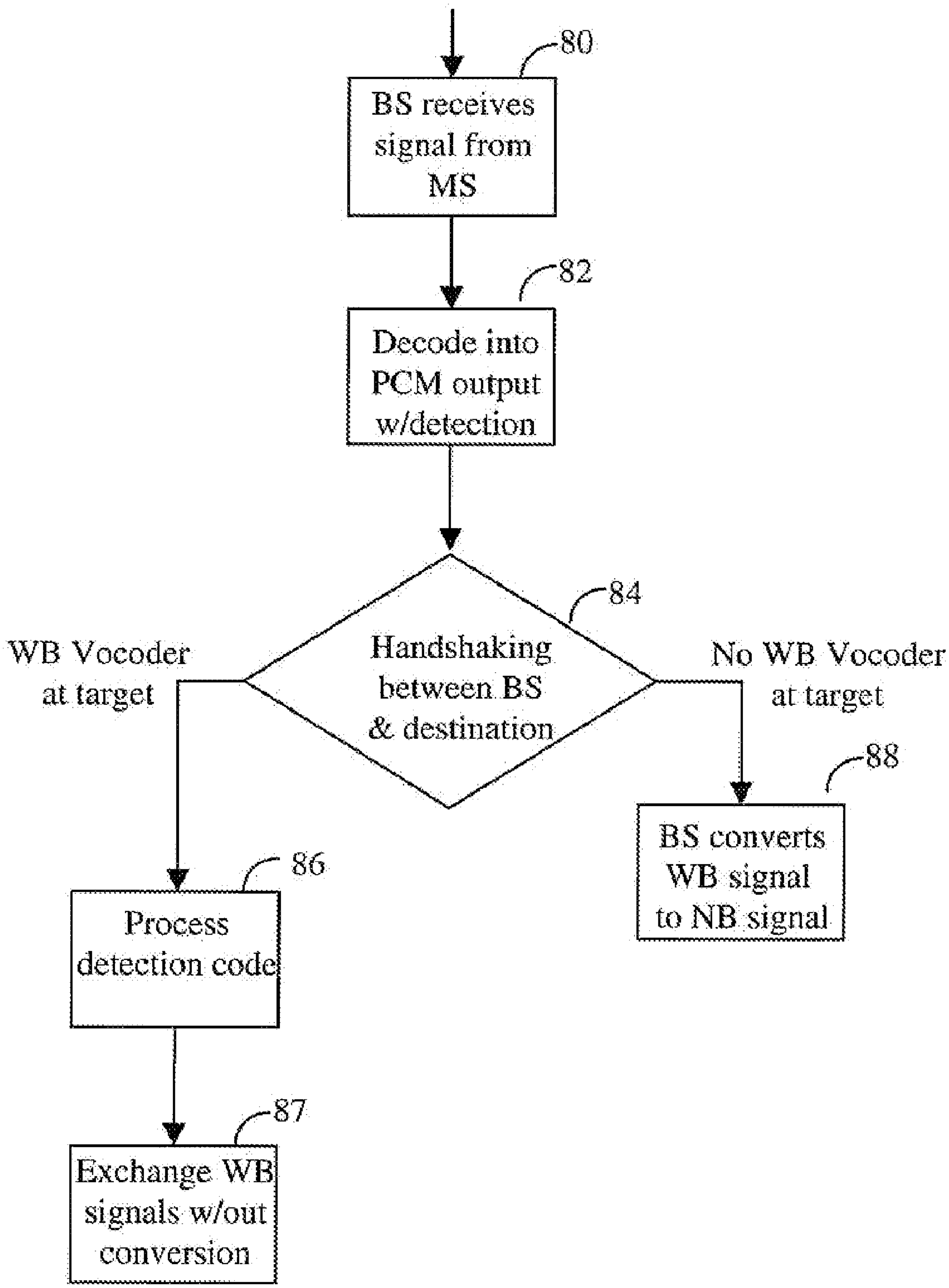
FIG. 8 is a flow chart of another method for determining whether to convert a wideband speech signal to a narrowband speech signal.

FIG. 8 is a flow chart for another method to determine whether to implement a wideband-to-narrowband signal conversion. This embodiment is implemented by base station wideband vocoders to convert a wideband signal into a narrowband signal if the target destination is not serviced by a wideband decoder.

At step 80, a base station receives and decodes an encoded signal from a remote unit. The encoded signal comprises a wideband speech signal and signaling overhead. Included within the signaling overhead is a target destination address. At step 82, the decoded signal is conveyed to the base station controller where the wideband speech signal is converted into a multi-bit pulse code modulation (PCM) output. A pseudorandom detection code is embedded within the PCM output. The embedded PCM output is transmitted to the target destination via a mobile switching center at step 84.

If the physical medium between the base station and the target destination supports wideband transmissions and the target destination is supported by a wideband decoder, then at step 86, the target destination detects the pseudorandom detection code and sets up a communication session with the base station. Implementation details of tandem vocoder operation are described in U.S. Pat. No. 5,903,862, entitled, "Method and Apparatus for Detection of Tandem Vocoding to Modify Vocoder Filtering," assigned to the assignee of the present invention and incorporated by reference herein. At step 87, the base station vocoder and target destination vocoder transmit wideband speech signals without conversion into narrowband speech signals.

In the alternative, tandem vocoding can be bypassed if the wideband vocoder at the base station has the same configuration as the wideband vocoder at the target destination. Implementation details of vocoder bypass are described in U.S. Pat. No. 5,956,673, entitled, "Detection and Bypass of Tandem Vocoding Using Detection Codes," assigned to the assignee of the present invention and incorporated by reference herein. If the target destination wideband vocoder can be bypassed, the base station can output a wideband signal without conversion into a narrowband signal.

If the target destination is not serviced by a wideband decoder, then at step 88, the base station implements a wideband-to-narrowband conversion, as described in the above embodiments.

Thus, novel and improved methods and apparatus for converting wideband-to-narrowband signals have been described. Those of skill in the art would understand that the various illustrative logical blocks, modules, circuits, and algorithm steps described in connection with the embodiments disclosed herein may be implemented as electronic hardware, software, firmware, or combinations thereof. The various illustrative components, blocks, modules, circuits, and steps have been described generally in terms of their functionality. Whether the functionality is implemented as hardware, software, or firmware depends upon the particular application and design constraints imposed on the overall system. Skilled artisans recognize the interchangeability of hardware, software, and firmware under these circumstances, and how best to implement the described functionality for each particular application.

Implementation of various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components. A processor executing a set of firmware instructions, any conventional programmable software module and a processor, or any combination thereof can be designed to perform the functions of the control element described herein. The processor may be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. An exemplary processor is coupled to the storage medium so as to read information from, and write information to, the storage medium. In the alternative, the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc. Those of skill would further appreciate that the data, instructions, commands, information, signals, bits, symbols, and chips that may be referenced throughout the above description are represented by voltages, currents, electromagnetic waves, magnetic fields or particles, optical fields or particles, or any combination thereof.

Various embodiments of the present invention have thus been shown and described. It would be apparent to one of ordinary skill in the art, however, that numerous alterations may be made to the embodiments herein disclosed without departing from the spirit or scope of the invention.

What is claimed is:

1. A device, comprising:

a control element for determining whether to convert a wideband speech signal into a narrowband speech signal;

a switch coupled to the control element, wherein the control element activates the switch if the control element determines that the wideband speech signal will be converted;

a filter for obtaining the wideband speech signal if the switch is activated, wherein the filter emphasizes a portion of the frequency spectrum of the wideband speech signal to output a signal with a non-flat frequency spectrum; and a down sampler for decimating the output signal of the bandwidth switching filter.

2. The device of claim 1, wherein the portion of the frequency spectrum is the frequencies between 1000 Hz and 3400 Hz.

3. The device of claim 1, wherein the non-flat frequency spectrum has a curve with a slope between 5 dB and 10 dB.

4. The device of claim 3, wherein the curve with a slope between 5 dB and 10 dB is located between 1000 Hz and 3400 Hz.

5. The device of claim 1, wherein the down sampler decimates at a rate of M=2, wherein an output signal y(n) is related to an input signal x(n) by the relationship y(n)=x(Mn).

6. The device of claim 1, wherein the filter further attenuates a high frequency portion of the wideband speech signal.

7. A device for converting a wideband speech signal into a narrowband speech signal, comprising:

a control element for determining whether to convert the wideband speech signal into the narrowband speech signal;

a switch coupled to the control element, wherein the control element activates the switch if the control element determines that the wideband speech signal will be converted;

a down sampler coupled to the switch, wherein the down sampler is for decimating the wideband speech signal if the switch is activated; and a filter for obtaining the decimated wideband speech signal, wherein the filter emphasizes a portion of the frequency spectrum of the wideband speech signal to output a signal with a non-flat frequency spectrum.

8. The device of claim 7, wherein the portion of the frequency spectrum is the frequencies between 1000 Hz and 3400 Hz.

9. The device of claim 7, wherein the non-flat frequency spectrum has a curve with a slope between 5 dB and 10 dB.

10. The device of claim 9, wherein the curve with a slope between 5 dB and 10 dB is located between 1000 Hz and 3400 Hz.

11. The device of claim 7, wherein the down sampler decimates at a rate of M=2, wherein an output signal y(n) is related to an input signal x(n) by the relationship y(n)=x(Mn).

12. The device of claim 7, wherein the filter further attenuates a high frequency portion of the wideband speech signal.

13. A device comprising:

a first element for creating a synthesized wideband speech signal; and a second element for enhancing the synthesized wideband speech signal, wherein the second element further comprises:

a post-filter element; and a filter for emphasizing a middle range of the frequency spectrum of the synthesized wideband speech signal and attenuating a high range of the frequency spectrum of the synthesized wideband speech signal, wherein the middle range of the frequency spectrum is between 800 Hz and 3500 Hz; and wherein the high range of the frequency spectrum is above the middle range of the frequency spectrum.

14. A method for transmitting wideband waveforms originating in a wireless communication system, comprising:

obtaining a signal carrying a wideband waveform at a base station, wherein the wideband waveform is for further transmission from the base station to a target terminal;

determining whether the target terminal can process the wideband waveform;

if the target terminal cannot process the wideband waveform, then converting the wideband waveform into a narrowband waveform with a non-flat frequency response; and if the target terminal can process the wideband waveform, then transmitting the wideband waveform from the base station to the target terminal without converting the wideband waveform into a narrowband waveform.

15. The method of claim 14, wherein the determination of whether the target terminal can process the wideband waveform comprises the step of determining whether the target terminal is supported by a wideband vocoder.

16. The method of claim 15, wherein the determination of whether the target terminal is supported by a wideband vocoder comprises:

embedding a detection code within a pulse code modulation (PCM) signal, wherein the PCM signal carries the wideband waveform; and if the target terminal detects the detection code, then transmitting an acknowledgement of the detection code from the target terminal via a second base station, wherein the second base station supports communication with the target terminal and a wireless communication system.

* * * * *